June 27, 1944.   J. H. HOOKER   2,352,323
PASSENGER AND FREIGHT CARRYING AIRCRAFT
Filed Jan. 3, 1942   3 Sheets-Sheet 3
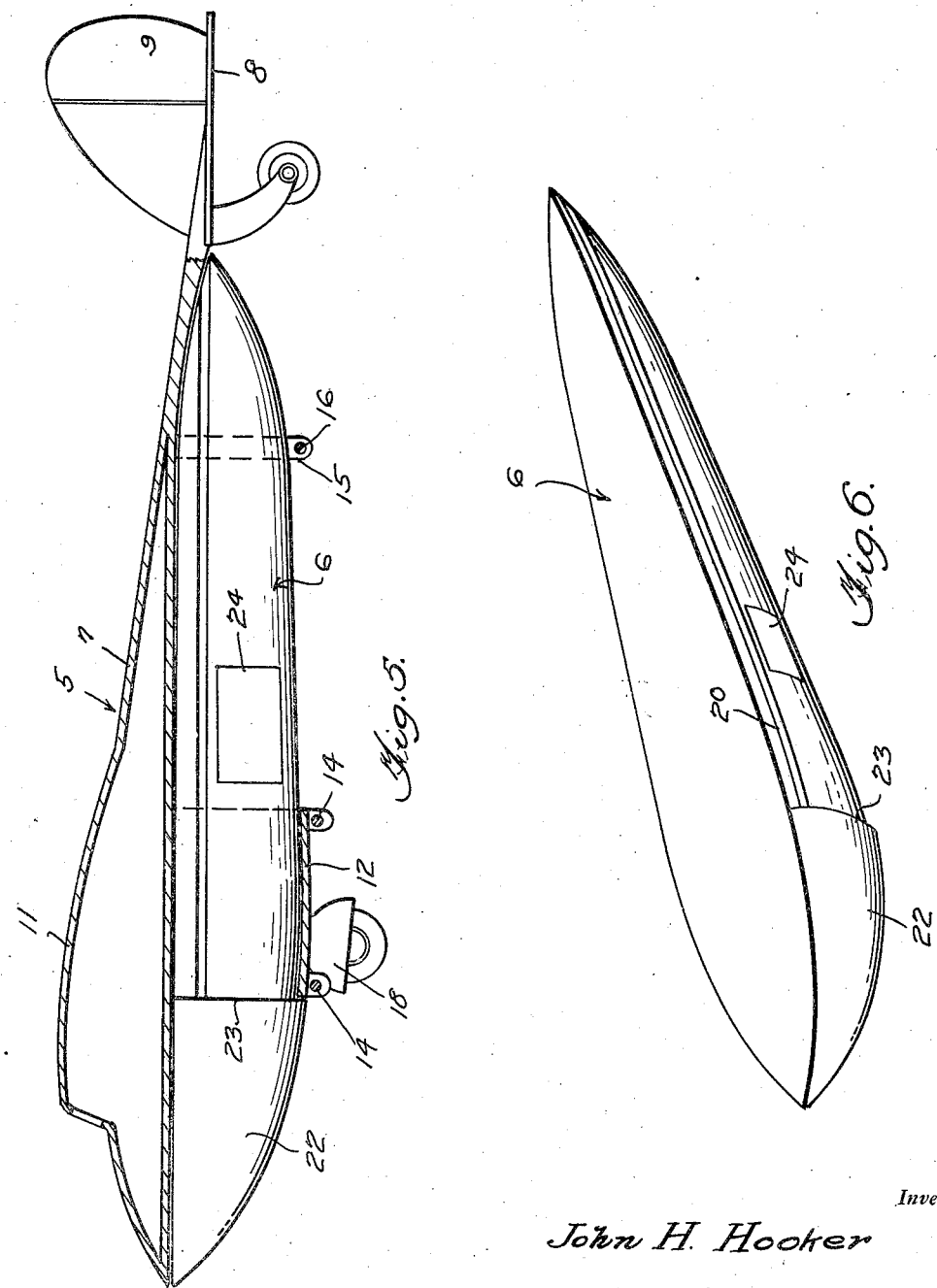
Inventor
John H. Hooker
By Clarence A. O'Brien
Attorney Patented June 27, 1944

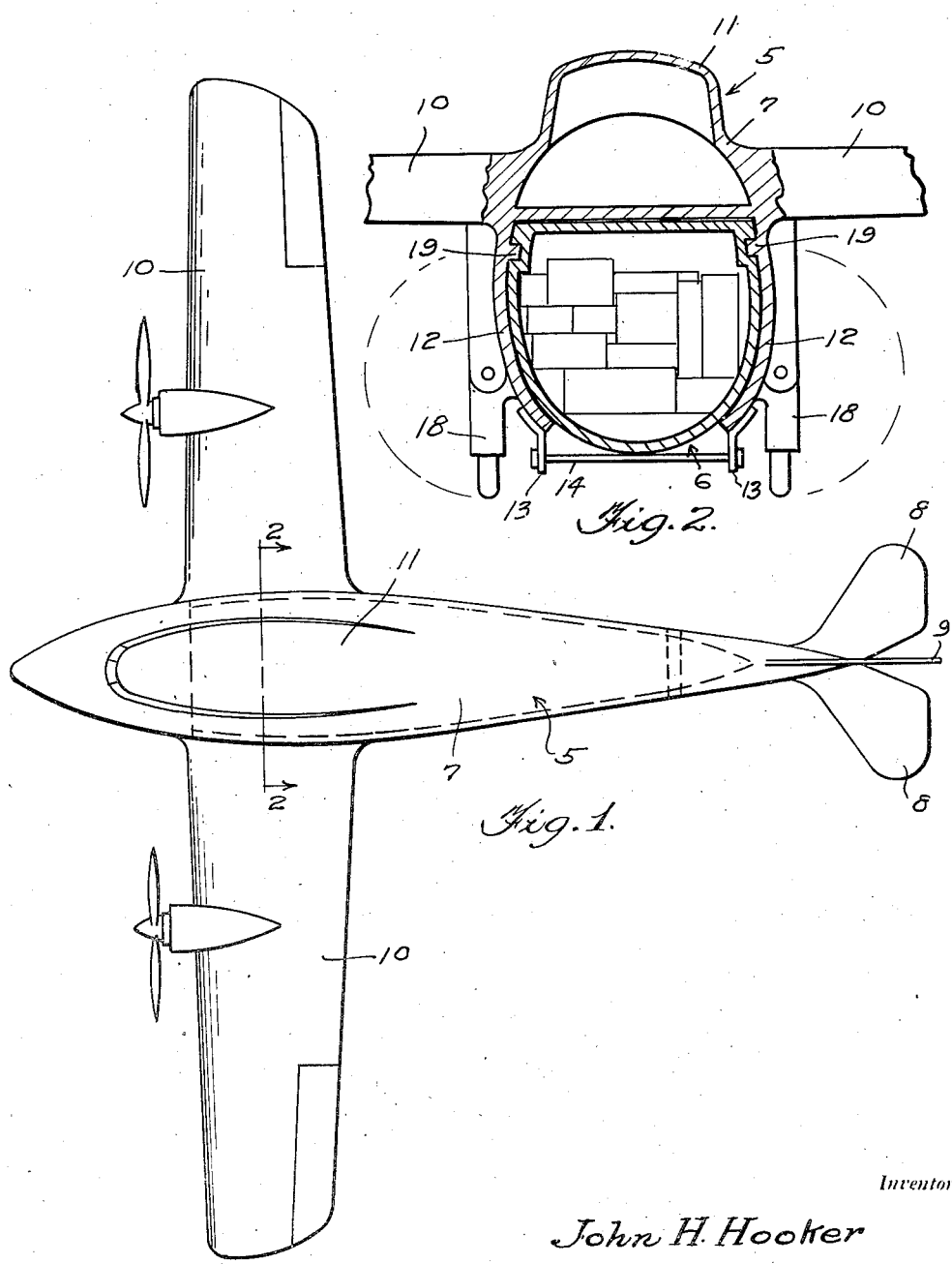

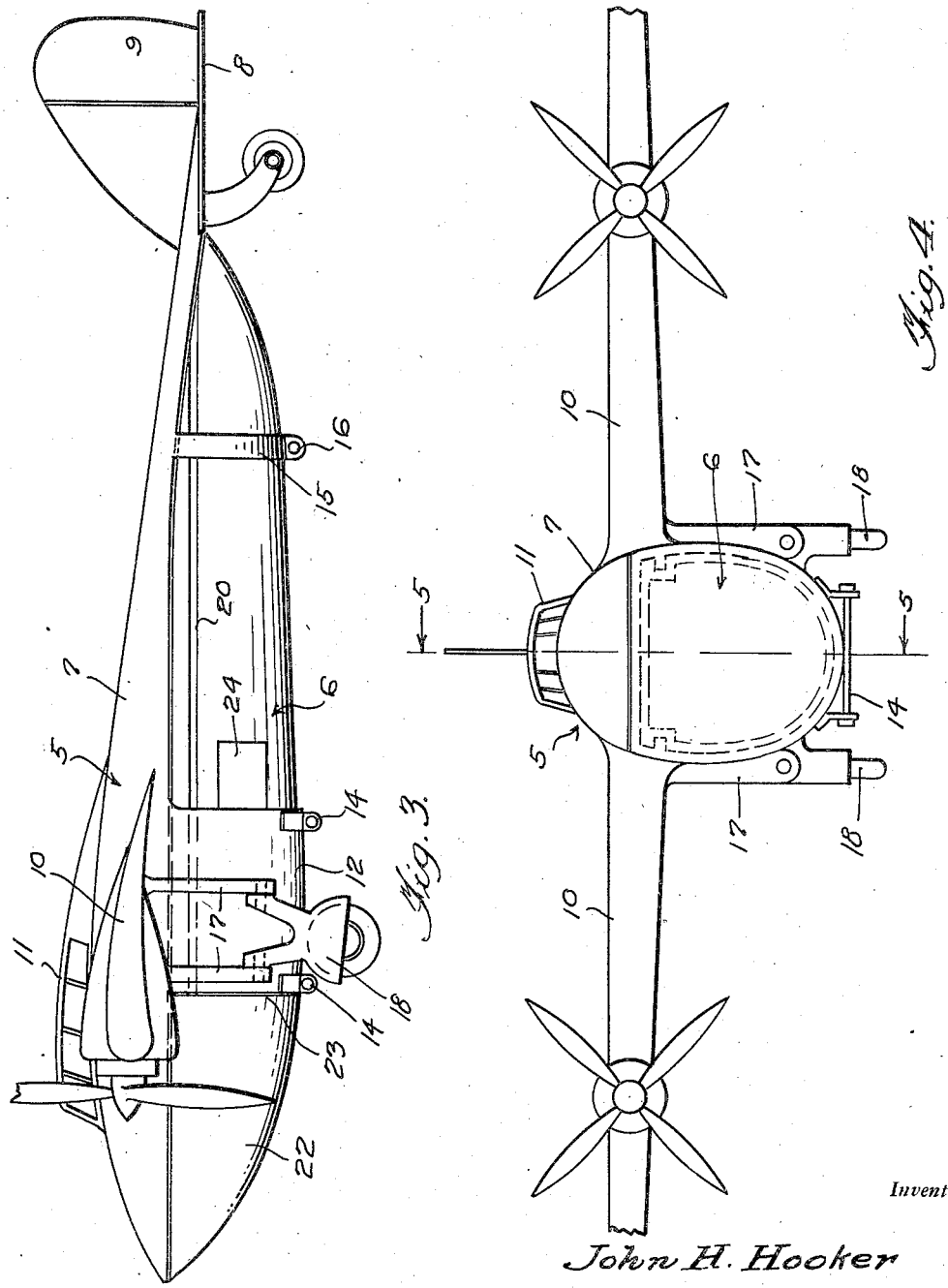

2,352,323

UNITED STATES PATENT OFFICE 2,352,323

PASSENGER AND FREIGHT CARRYING AIRCRAFT

John H. Hooker, Miami, Fla.

Application January 3, 1942, Serial No. 425,561

2 Claims. (Cl. 244—118)

This invention relates to new and useful improvements in aeronautics, and more particularly to aircraft especially designed for the convenient and rapid transportation of freight.

The principal object of the present invention is to provide an aircraft of sectional construction wherein a substantial portion of the fuselage is constructed to provide a removable cargo receptacle.

Another important object of the invention is to provide a freight carrying aircraft wherein the fuselage is constructed in such a manner as to be readily applied or removed with respect to a specially constructed aircraft to the end that an aircraft can be brought down, have its cargo receptacle detached and another attached and fly off without any delay of time such as is required in unloading and loading.

Other objects and advantages of the invention will become apparent to the reader of the following description.

In the drawings:

Figure 1 represents a top plan plan view of the improved aircraft.

Figure 2 is a fragmentary sectional view taken substantially on line 2—2 of Figure 1.

Figure 3 is a side elevational view.

Figure 4 is a front elevational view.

Figure 5 is a longitudinal sectional view taken substantially on line 5—5 of Figure 4.

Figure 6 is a perspective view of the cargo receptacle.

Referring to the drawings wherein like numerals designate like parts, it can be seen that the aircraft is composed of two main parts, namely, the powered part generally referred to by numeral 5, and the cargo receptacle generally referred to by numeral 6.

The powered unit of the aircraft comprises a substantially shallow fuselage 7 having the usual elevator rudder and wing denoted by numerals 8, 9 and 10. At the forward portion of the fuselage 7 is a cab 11 for the pilot and passengers. The propulsion plants are located on the wings 10.

In carrying out the present invention it is preferable that a substantially wide side wall section 12 depend from each side of the fuselage 7 and be of substantially arcuate shape, but substantially straight at their lower ends so that the rear reduced end of the cargo receptacle can easily be lowered therebetween as it is moved forwardly from its carried position with respect to the powered unit 5 of the complete aircraft.

Obviously, these side wall portions 12, 12 will have some flexibility and it is preferable that lugs 13, 13 be located at the lower edges thereof and connected by tie rods 14 to insure a firm contact of these side walls with respect to the receptacle 6.

A narrower band 15 is provided at the rear portion of the fuselage 7, the same depending to encompass the rear portion of the receptacle 6, the lower ends of the band 15 being connected by a tie rod 16.

Arms 17 depend from the wings 10 and carry wheel assemblies 18 which can be collapsed when the plane is in flight by swinging the same upwardly on the lines shown in Figure 2.

Ribs 19, 19 are provided at the inner sides of the walls 12 to enter grooveways 20 on the sides of the receptacle 6. Obviously, this rib and groove connection permits easy removal of the receptacle 6 from the cradle 12, 15 of the ship proper 5.

The receptacle 6 is constructed in shape similar to that of a cigar split longitudinally, the same having a head portion 22 substantially larger than any other portion of the receptacle so as to define a shoulder 23 which is intended to abut the forward edges of the walls 12, 12. This head underlies the nose portion of the unit 5 of the aircraft.

Obviously, doors 24 and other closures can be provided for the receptacle 6 so as to permit access to the cargo therein.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In an aircraft, a fuselage, a pair of laterally spaced side wall members depending from said fuselage adjacent the nose end thereof, a cargo carrying body of substantially the length of the fuselage fitting between said walls, means to clamp said walls to said body, and a pair of clamping bands depending from said fuselage adjacent the tail end thereof and embracing said body.

2. In an aircraft, a fuselage, a pair of laterally spaced side wall members depending from said fuselage adjacent the nose end thereof, a cargo carrying body of substantially the length of the fuselage fitting between said walls, means to clamp said walls to said body, and landing gear mounted on said side walls.

JOHN H. HOOKER.